United States Patent
Uemura et al.

(10) Patent No.: US 11,145,062 B2
(45) Date of Patent: Oct. 12, 2021

(54) ESTIMATION APPARATUS, ESTIMATION METHOD, AND NON-TRANSITORY COMPUTER-READABLE STORAGE MEDIUM FOR STORING ESTIMATION PROGRAM

(71) Applicant: FUJITSU LIMITED, Kawasaki (JP)

(72) Inventors: Kento Uemura, Kawasaki (JP); Suguru Yasutomi, Kawasaki (JP); Takashi Katoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 16/811,108

(22) Filed: Mar. 6, 2020

(65) Prior Publication Data

US 2020/0302611 A1 Sep. 24, 2020

(30) Foreign Application Priority Data

Mar. 19, 2019 (JP) .............................. JP2019-051976

(51) Int. Cl.
 *G06T 7/00* (2017.01)
 *G06T 7/11* (2017.01)
 *G06N 3/08* (2006.01)
 *G06K 9/62* (2006.01)

(52) U.S. Cl.
 CPC .............. *G06T 7/11* (2017.01); *G06K 9/6256* (2013.01); *G06N 3/088* (2013.01); *G06T 2207/20081* (2013.01)

(58) Field of Classification Search
 CPC . G06T 7/11; G06T 2207/20081; G06N 3/088; G06N 3/0454; G06K 9/6256; G06K 9/6262; G06K 9/38; G06K 2209/23
 See application file for complete search history.

(56) References Cited

U.S. PATENT DOCUMENTS

| 2019/0087734 | A1 | 3/2019 | Ide et al. | |
| 2019/0293462 | A1* | 9/2019 | Choi | ..................... G06N 3/0472 |
| 2019/0294972 | A1* | 9/2019 | Keller | ..................... G06N 3/082 |
| 2020/0090069 | A1* | 3/2020 | Mandt | ..................... G06N 20/00 |
| 2020/0137384 | A1* | 4/2020 | Kwong | ................ H04N 19/593 |
| 2020/0145661 | A1* | 5/2020 | Jeon | ......................... G06N 3/08 |

FOREIGN PATENT DOCUMENTS

| JP | 2017-059057 A | 3/2017 |
| JP | 2017-201535 A | 11/2017 |
| WO | 2017/168870 A1 | 10/2017 |

* cited by examiner

*Primary Examiner* — Ping Y Hsieh
(74) *Attorney, Agent, or Firm* — Fujitsu Patent Center (57) ABSTRACT

An estimation method implemented by a computer, the estimation method includes: executing learning processing by training an autoencoder with a data group corresponding to a specific task; calculating a degree of compression of each part regarding data included in the data group by using the trained autoencoder; and estimating a common part with another piece of data included in the data group regarding the data corresponding to the specific task based on the calculated degree of compression of each part.

8 Claims, 11 Drawing Sheets

ESTIMATION APPARATUS, ESTIMATION METHOD, AND NON-TRANSITORY COMPUTER-READABLE STORAGE MEDIUM FOR STORING ESTIMATION PROGRAM

CROSS-REFERENCE TO RELATED APPLICATION

This application is based upon and claims the benefit of priority of the prior Japanese Patent Application No. 2019-51976, filed on Mar. 19, 2019, the entire contents of which are incorporated herein by reference.

FIELD

An embodiment discussed herein is related to an estimation apparatus, an estimation method, and a non-transitory computer-readable storage medium storing an estimation program.

BACKGROUND

In machine learning, for example, a given task is learned from an image data group. As the given task, discriminating a manufacture of a car from an image obtained by photographing the car, predicting a risk of disease from a computed tomography (CT) image for medical use, and so forth are cited.

In machine learning, there is an autoencoder (AE) as an algorithm of dimensionality reduction using a neural network. A technique for generating data having features represented by feature information that is semantically annotated and feature information that is not semantically annotated by this autoencoder is disclosed.

An example of the related art includes International Publication Pamphlet No. WO 2017/168870.

SUMMARY

According to an aspect of the embodiment, an estimation method implemented by a computer, the estimation method includes: executing learning processing by training an autoencoder with a data group corresponding to a specific task; calculating a degree of compression of each part regarding data included in the data group by using the trained autoencoder; and estimating a common part with another piece of data included in the data group regarding the data corresponding to the specific task based on the calculated degree of compression of each part.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

In the related art, there is not a method for selectively excluding information which is unnecessary for a specific task and is desired to be kept from being used for learning from an image data group. For example, in the related art, there is a problem that it is difficult to automatically estimate information desired for the specific task from the image data group without troublesome labor.

This problem will be described. In machine learning, in addition to information desired for a task of the machine learning, information that is not directly necessary for the task is included in a data group that becomes a learning target. For example, in the case of a task of discriminating a manufacturer of a car from an image obtained by photographing the car, information on a license plate included in the image and information on pedestrian and background part are unnecessary information or information desired to be explicitly avoided for use for the machine learning. For example, this information is information that is not directly necessary for the task of discriminating the manufacturer of the car. However, even with the same data group, desired information differs for each task. Therefore, with an across-the-board criterion or rule, it is difficult to automatically estimate the desired information for each task. For example, in the related art, it is difficult to automatically estimate information desired for a specific task without troublesome labor.

The embodiment intends to automatically estimate information corresponding to a specific task without troublesome labor in one aspect.

According to the one embodiment aspect, it becomes possible to automatically estimate information corresponding to a specific task without troublesome labor.

An embodiment of an estimation program, an estimation apparatus, and an estimation method disclosed by the present application will be described in detail below based on the drawings. The present disclosure is not limited by the embodiment.

Embodiment

Configuration of Estimation Apparatus According to Embodiment

Figure 1:
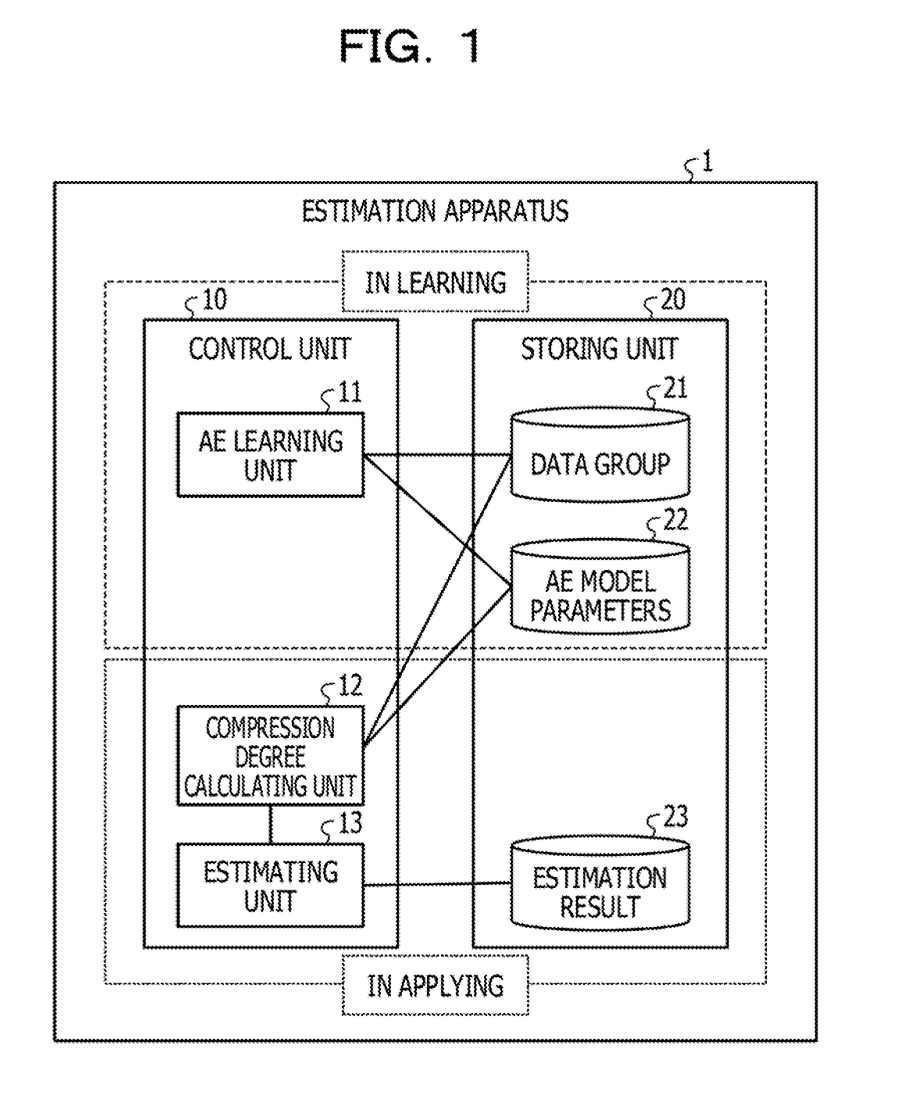
FIG. 1 is a functional block diagram illustrating a configuration of an estimation apparatus according to an embodiment.

FIG. 1 is a functional block diagram illustrating a configuration of an estimation apparatus according to an embodiment. An estimation apparatus 1 illustrated in FIG. 1 executes learning processing by training an autoencoder with a data group corresponding to, a specific task and estimates desired information in data included in the data group (common information of the data group) based on difference in compression rate of each part of the data by using the trained autoencoder (may be referred to as the learned auto encoder). The autoencoder will be represented as AE hereinafter.

The estimation apparatus 1 includes a control unit 10 and a storing unit 20.

The control unit 10 corresponds to an electronic circuit such as a central processing unit (CPU). The control unit 10 includes an internal memory for storing a program that prescribes various processing procedures and control data and executes various kinds of processing based on them. The control unit 10 includes an AE learning unit 11, a compression degree calculating unit 12, and an estimating unit 13. The AE learning unit 11 is one example of the learning unit. The compression degree calculating unit 12 is one example of the calculating unit. The estimating unit 13 is one example of the estimating unit.

The storing unit 20 is a semiconductor memory element such as a random access memory (RAM) and a flash memory or a storing apparatus such as a hard disk and an optical disc. The storing unit 20 includes a data group 21, AE model parameters 22, and an estimation result 23.

The data group 21 is a collection of image data corresponding to a specific task. The specific task is a task of discriminating the manufacturer of a car from an age obtained by photographing the car or a task of predicting the risk of disease from a CT image for medical use, for example. The data group 21 is a collection of image data corresponding to such a specific task. In each piece of data of the data group 21, in addition to information desired for the specific task, information unnecessary for the specific task is included. As one example of the unnecessary information, there is information on the background of a car, a license plate, a pedestrian, and so forth in the case of the task of discriminating the manufacturer of the car. Furthermore, as another example of the unnecessary information, there is information relating to privacy such as individual information.

The AE model parameters 22 are adjusted parameters of an AE model that represents the result of carrying out the learning in such a manner that an input and an output of the AE correspond with each other. In the parameters, the weight of each of an encoder and a decoder included in the AE is included. The AE model parameters 22 are adjusted by the AE learning unit 11.

The estimation result 2 is a result of estimating the common information of the data group 21 corresponding to the specific task. The estimation result 23 is generated by the estimating unit 13 to be described later.

The AE learning unit 11 learns the AE with the data group 21 corresponding to the specific task. For example, the AE learning unit 11 adjusts the parameters of the AE in such a manner that the error between the input and output of the AE becomes small by using the unsupervised data group 21 corresponding to the specific task. Then, the AE learning unit 11 generates the AE model corresponding to the specific task. Then, the AE learning unit 11 holds the parameters of the learned AE in the AE model parameters 22.

Figure 2:
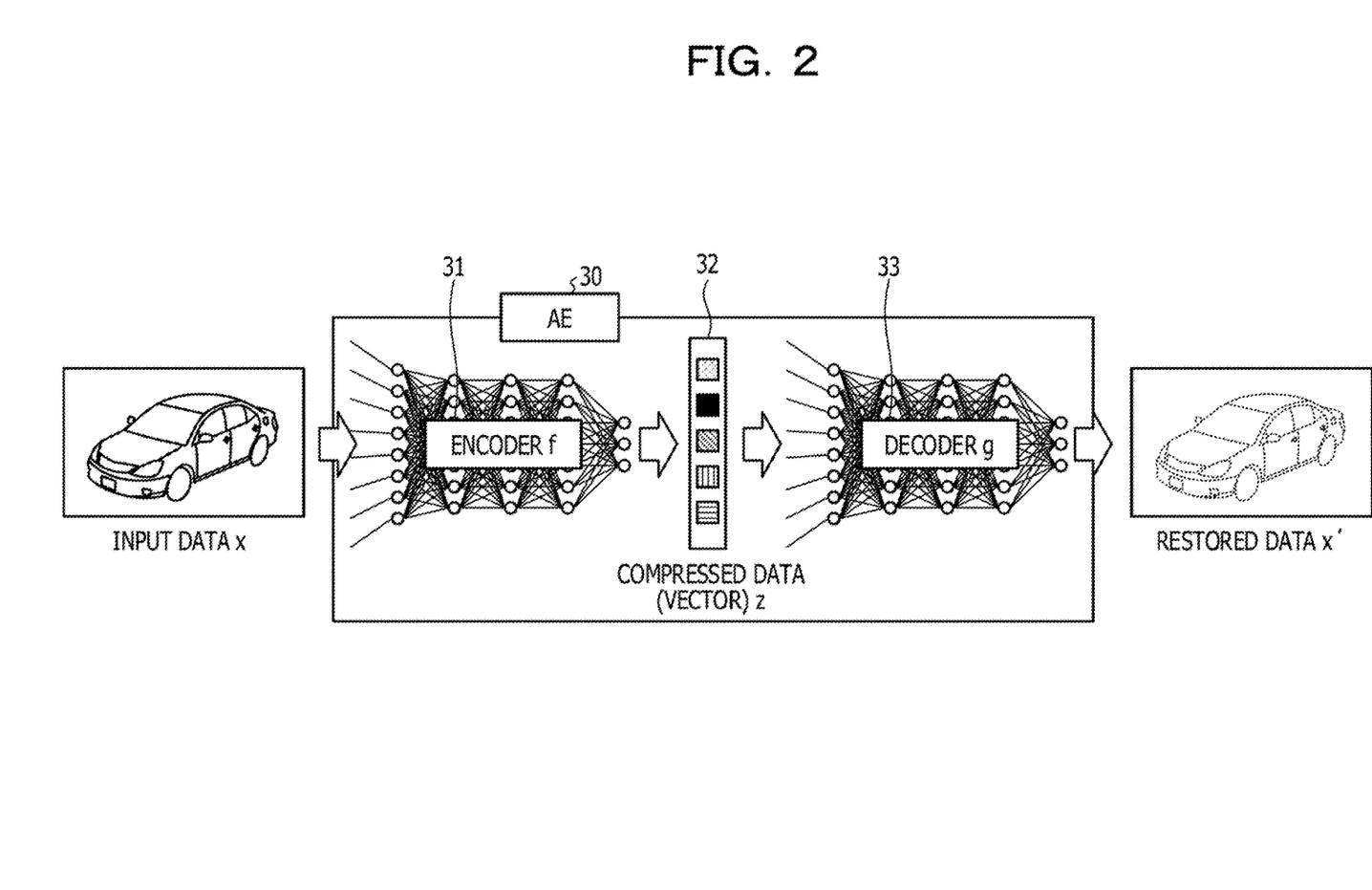
FIG. 2 illustrates one example of an AE model according to the embodiment.
Figure 3:
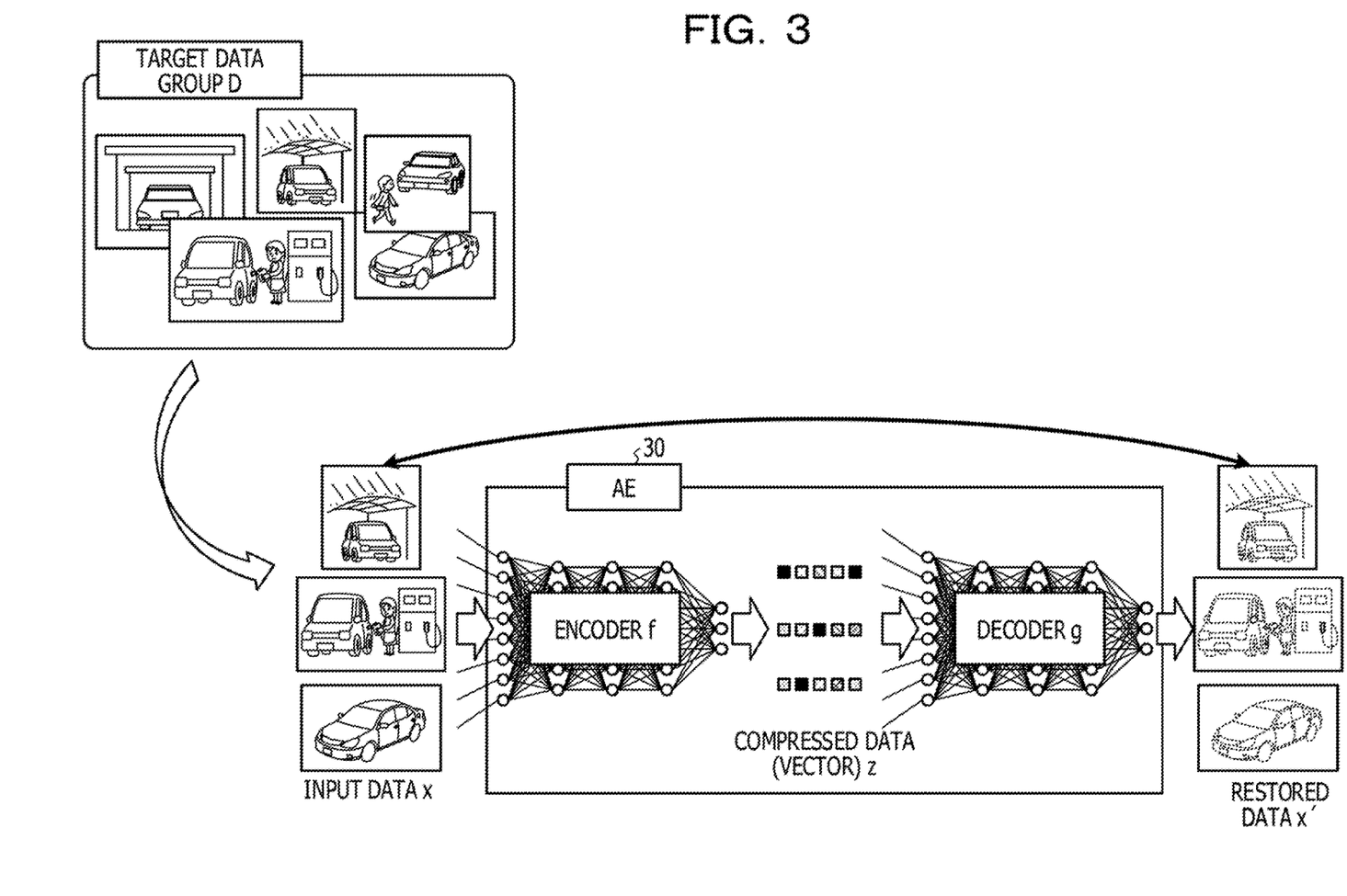
FIG. 3 illustrates one example of AE learning processing according to the embodiment.

AE learning processing according to the embodiment will be described with reference to FIG. 2 and FIG. 3. FIG. 2 is a diagram illustrating one example of an AE model according to the embodiment. FIG. 3 is a diagram illustrating one example of AE learning processing according to the embodiment. Here, the specific task will be described as a task of "discriminating the manufacturer of a car from an image obtained by photographing the car."

As illustrated in FIG. 2, an AE 30 includes an encoder f 31, compressed data (vector) z 32, and a decoder g 33. The encoder f 31 compresses input data x. A compressed feature is set in the compressed data (vector) z 32. The decoder g 33 restores the compressed data (vector) z 32 and generates reconstructed data x', wherein the reconstructed data may be referred to as "reconstructed data", "restored data", and the like.

As illustrated in FIG. 3, the AE learning unit 11 inputs each piece of data of an unsupervised target data group D corresponding to the specific task. The AE learning unit 11 learns the AE 30 in such a manner that the restored data x' corresponds with the input data x. For example, the AE learning unit 11 adjusts a parameter (for example, weight) of each of the encoder f 31 and the decoder g 32 in such a manner that the error between the restored data x' and the input data x becomes small. For example, the AE learning unit 11 learns the compression of the target data group D by the encoder f 31. Information (element) that is more common to the target data group D is compressed at a higher compression rate and the AE learning unit 11 sets the compressed feature in the compressed data (vector) z 32. The compressed data (vector) z 32 is the compressed feature located at an intermediate position between the encoder f 31 and the decoder g 32 and therefore will be referred to as "intermediate feature" in some cases hereinafter.

Referring back to FIG. 1, the compression degree calculating unit 12 calculates the degree of compression of each part (element) regarding the data included in the data group 21 by using the learned AE. For example, the compression degree calculating unit 12 generates first compressed data (vector) z 32 (first intermediate feature) obtained by inputting the data included in the data group 21 and causing the data to be learned by using the AE that has been learned. The compression degree calculating unit 12 generates second compressed data (vector) z 32 (second intermediate feature) obtained by inputting data resulting from changing (processing) an element of the data and causing the data to be learned. The term, element, described herein, may be a rectangle with a size defined in advance or be a circle or be one pixel. The compression degree calculating unit 12 calculates the degree of compression of each element of the data by using the first compressed data (vector) z 32 (first intermediate feature) and the second compressed data (vector) z 32 (second intermediate feature).

The degree of compression of each element of the data may be represented by the following expression (1), for example. The expression (1) represents that the degree of compression is calculated based on the degree of change in an element xi of data x. i denotes an index. ci in the left side of the expression (1) denotes an index that represents the degree of compression of the element xi of the data x. f(x) in the right side of the expression (1) denotes the compressed data (vector) (intermediate feature) z of the data x.

$$c_i = \left\| \frac{\partial}{\partial x_i} f(x) \right\|^2 \qquad \text{expression (1)}$$

For example, the compression degree calculating unit 12 calculates, as the degree of compression, a degree about to what extent the corresponding compressed data (vector)

(intermediate feature) z changes when the element xi of the data x is changed by a minute amount. For example, regarding the element xi, when the degree of change is low, the degree of compression becomes high (in the expression (1), the index that represents the degree of compression becomes small). This means that the compression is carried out at a high compression rate and the extent of communality is high regarding the element xi. For example, with the AE, the compression is carried out at a higher compression rate for an element common to a larger amount of data in the data group 21. Therefore, this allows the compression degree calculating unit 12 to, estimate, from the degree of compression of an element, the extent of communality with, an element of another piece of data regarding the element.

In the expression (1), the amount of change in the norm ($\|z\|$) of the intermediate feature z (=f(x)) with respect to change in the element xi of the data x is defined as the index $c_i$ that represents the degree of compression. However, through modifying the expression (1), the reciprocal of the amount of change in the norm ($\|z\|$) of the intermediate feature z (=f(x)) with respect to change in the element xi of the data x may be defined as the index $c_i$ that represents the degree of compression.

The compression degree calculating unit 12 may calculate the degree of compression by the following methods.

As one example, the compression degree calculating unit 12 may calculate the amount of change in the norm ($\|z\|$) of the intermediate feature z (=f(x)) with respect to change in $x_{ij}$ of the data x as the index that represents the degree of compression. $x_{ij}$ denotes the pixel value of a position (i, j) regarding the data x. An index $p_{ij}$ that represents the degree of compression of $x_{ij}$ of the data x is represented by the following expression (2), for example.

$$p_{ij} = \partial\|z\|/\partial x_{ij} \qquad \text{expression (2)}$$

As another example, the compression degree calculating unit 12 may calculate, as the index that represents the degree of compression, a value obtained by weighting the index $p_{ij}$ that represents the degree of compression of $x_{ij}$ of the data x by a restoration error between and a pixel value $x'_{ij}$ of a restoration point. The index $p_{ij}$ that represents the degree of compression of $x_{ij}$ of the data x is represented by the following expression (3), for example. This method is effective when a restoration error of the AE remains. Due to this, when the restoration error of the AE remains, the compression degree calculating unit 12 may ensure reliability of the index that represents the degree of compression by correcting the index that represents the degree compression by the reconstruction error, wherein the reconstruction error may be referred to as the restoration error.

$$p_{ij} = |x_{ij} - x'_{ij}|(\partial\|z\|/\partial x_{ij}) \qquad \text{expression (3)}$$

As another example, the compression degree calculating unit 12 may calculate, as the index that represents the degree of compression, a value obtained by giving a weight defined in consideration of the surroundings of $x_{ij}$ to the index $p_{ij}$ that represents the degree of compression of $x_{ij}$ of the data x. The index $p_{ij}$ that represents the degree of compression of $x_{ij}$ of the data x is represented by the following expression (4), for example. This method is effective in the case of an image in which continuity exists between adjacent pixels, such as an image obtained by photographing nature, and in the case of an image including noise. Due to this, an auxiliary image to be described later become smooth and the compression degree calculating unit 12 may improve robustness against some kind of normal value and noise. $q_{ij}$ denotes distribution of weighting, and it suffices for the distribution to be uniform distribution, normal distribution, or the like of a certain range centered at $x_{ij}$.

$$p_{ij} = \Sigma_{ij} q_{ij}(\partial\|z\|/\partial x_{ij}) \qquad \text{expression (4)}$$

As another example, the compression degree calculating unit 12 may calculate the index that represents the degree of compression of $x_{ij}$ of the data x by a combination of the above-described methods.

The estimating unit 13 estimates common elements with another piece of data included in the data group 21 regarding the data corresponding to the specific task based on the degree of compression of each part (element). For example, regarding each piece of data included in the data group 21 the estimating unit 13 generates an auxiliary image by using the index that represents the degree of compression of each element. As one example, estimating unit 13 arranges the indexes that represent the degree of compression of the respective elements and generates a heat map as the auxiliary image. For example, when the expression (1) is applied to calculation of the index that represents the degree of compression, the estimating unit 13 generates the auxiliary image in which the element about which the index that represents the degree of compression is smaller becomes an element highlighted to a larger extent. For example, it suffices for the estimating unit 13 to generate the auxiliary image in which the element is highlighted to a larger extent when the degree of compression is higher. Then, the estimating unit 13 estimates the highlighted elements as common elements by using the auxiliary image. For example, the estimating unit 13 estimates the elements free from the highlighting as non-common elements. Then, the estimating unit 13 holds the estimated common elements in the estimation result 23 as well as the auxiliary image for each piece of data. In this manner, the estimating unit 13 may estimate desired information corresponding to the specific task. For example, the estimating unit 13 may estimate information unnecessary for the specific task.

One Example of Compression Degree Calculation Processing

Figure 4A:
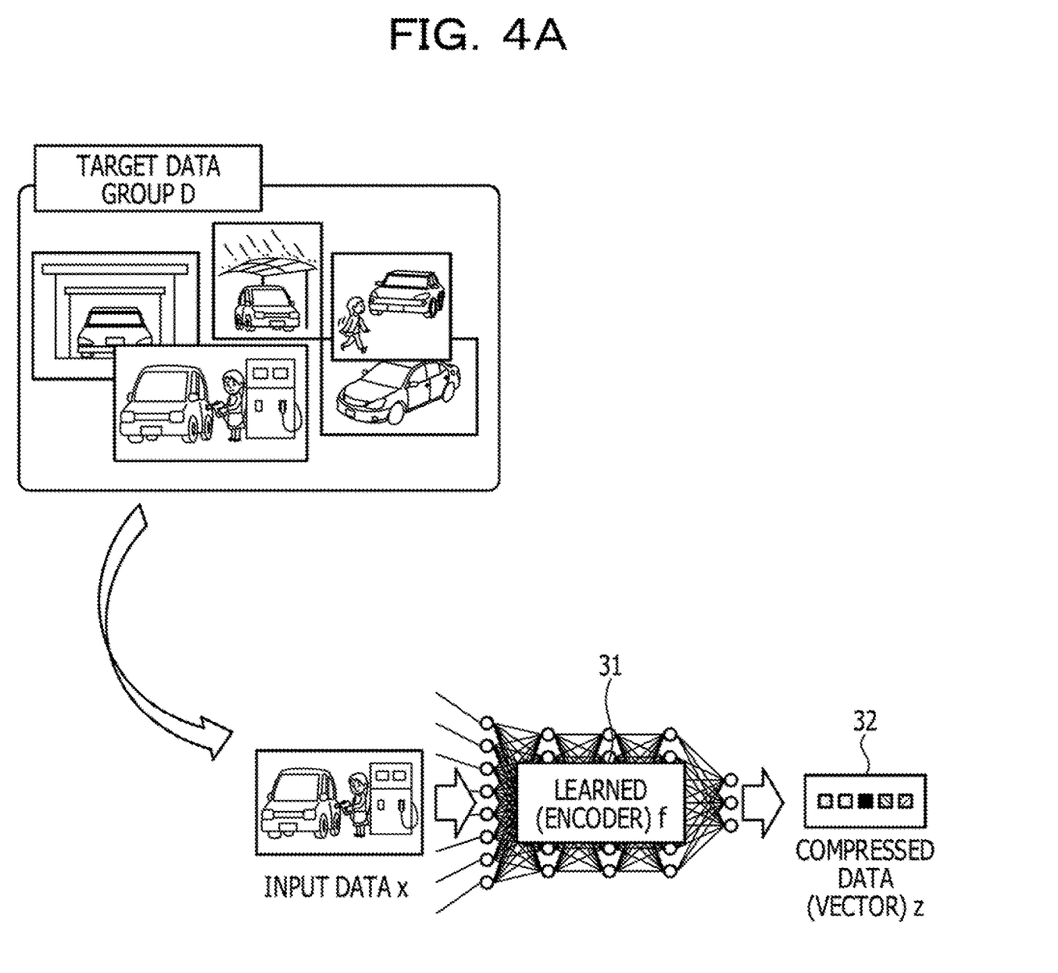
FIG. 4A is a diagram (1) illustrating one example of compression degree calculation processing according to the embodiment.
Figure 4B:
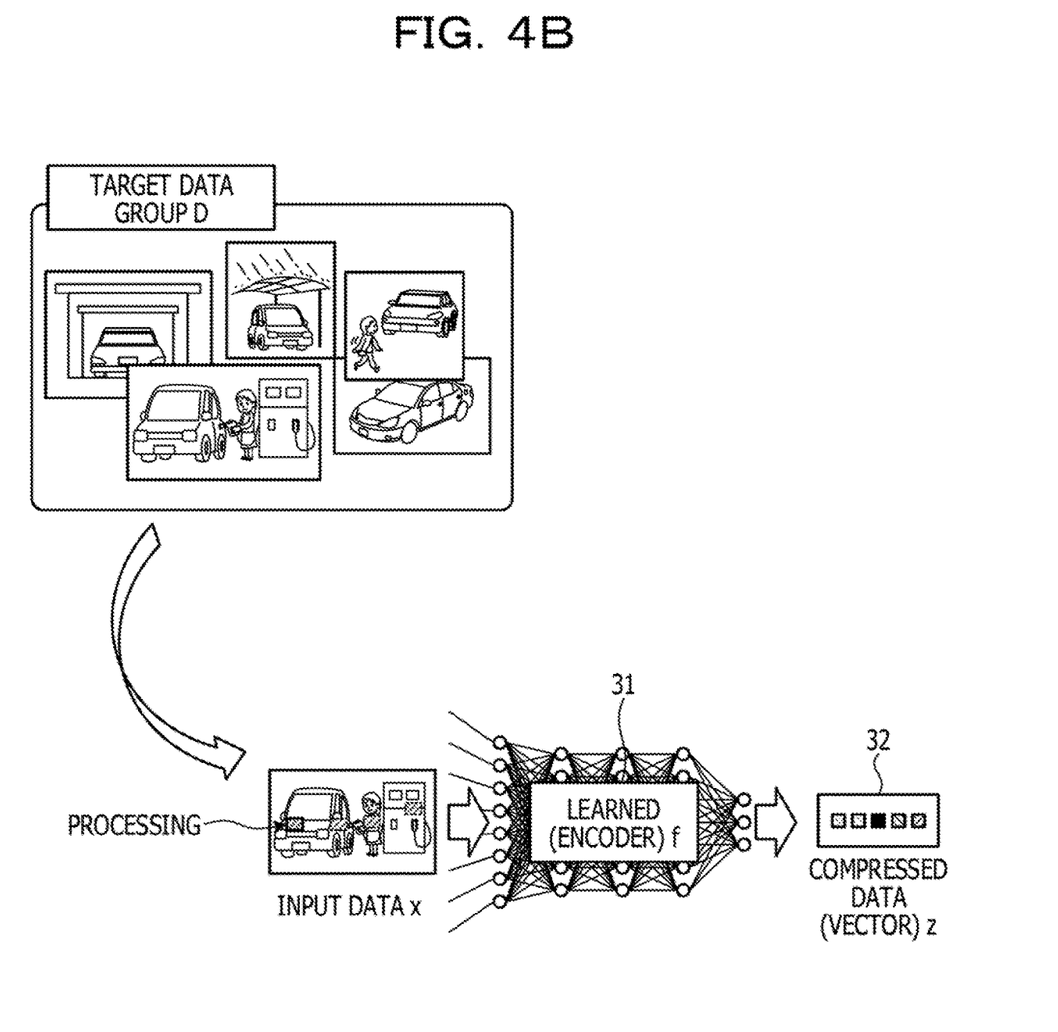
FIG. 4B is a diagram (2) illustrating one example of compression degree calculation processing according to the embodiment.

FIG. 4A and FIG. 4B are diagrams illustrating one example of compression degree calculation processing according to the embodiment. Here, as with FIG. 3, the specific task will be described as a task of "discriminating the manufacturer of a car from an image obtained by photographing the car."

As illustrated in FIG. 4A, the compression degree calculating unit 12 generates the first compressed data (vector) z 32 (first intermediate feature) obtained by inputting the data x included in the target data group D to the AE that has been learned and causing the data x to be learned.

As illustrated in FIG. 4B, the compression degree calculating unit 12 generates the second compressed data (vector) z 32 (second intermediate feature) obtained by inputting the data x resulting from changing an element of the data to the AE that has been learned and causing the data x to be learned. Here, the compression degree calculating unit 12 inputs the respective pieces of data x obtained by changing partial elements in the image in turn to the AE and generates the second compressed data (vector) z 32.

Then, the compression degree calculating unit 12 calculates the degree of compression of each element of the data by using the first compressed data (vector) z 32 (first intermediate feature) and the second compressed data (vector) z 32 (second intermediate feature).

One Example of Estimation Processing

Figure 5:
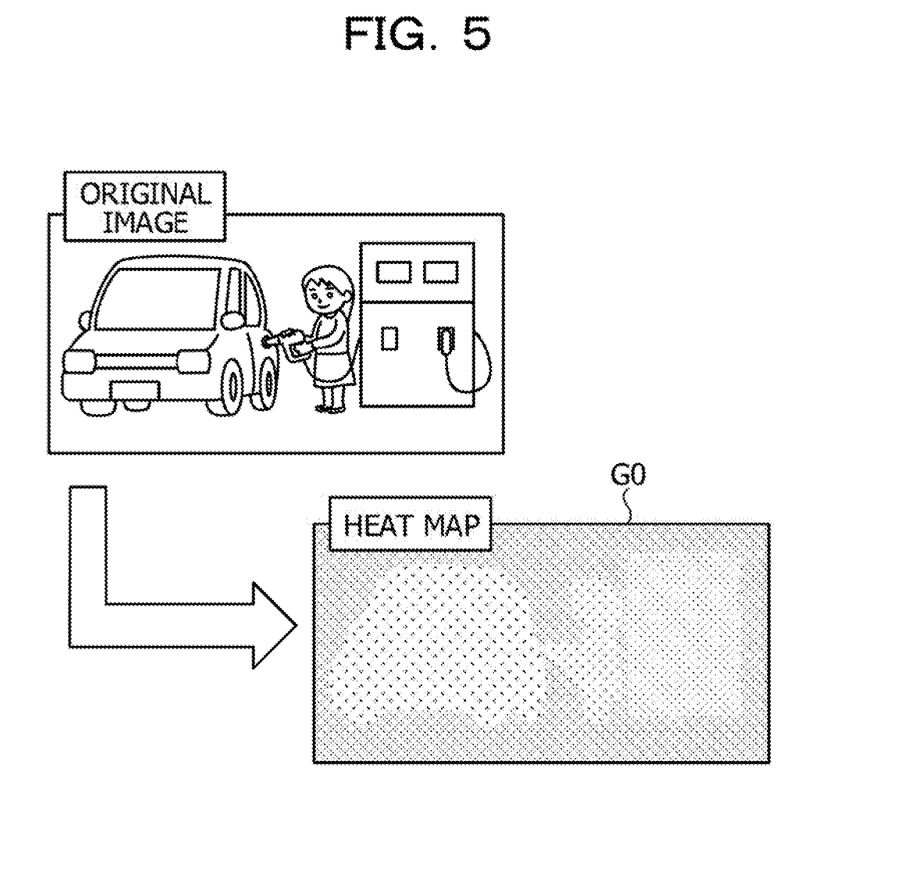
FIG. 5 illustrates one example of estimation processing according to the embodiment.

FIG. 5 is a diagram illustrating one example of estimation processing according to the embodiment. Here, as with FIG. 3, FIG. 4A, and FIG. 4B the specific task will be described as a task of "discriminating the manufacturer of a car from an image obtained by photographing the car." Furthermore, as the index that represents the degree of compression, the index calculated based on the expression (1) is employed.

As illustrated in FIG. 5, regarding the original image, the estimating unit 13 arranges the indexes that represent the degree of compression of each element and generates a heat map G0 as an auxiliary image. Here, the estimating unit 13 generates the heat map G0 in which the element about which the index that represents the degree of compression is smaller becomes an element highlighted to a larger extent. For example, the estimating unit 13 generates the heat map G0 in which the element is highlighted to a larger extent when the degree of compression is higher. Then, the estimating unit 13 estimates the highlighted elements as the common elements by using the heat map G0. Here, the "vehicle body" becomes a highlighted element group, and therefore the "vehicle body" is estimated as the common elements.

Thereafter, the estimating unit 13 may use the information on the heat map for a binarized image (mask image), learning of a task, and so forth.

Other Examples of Estimation Processing

Figure 6A:
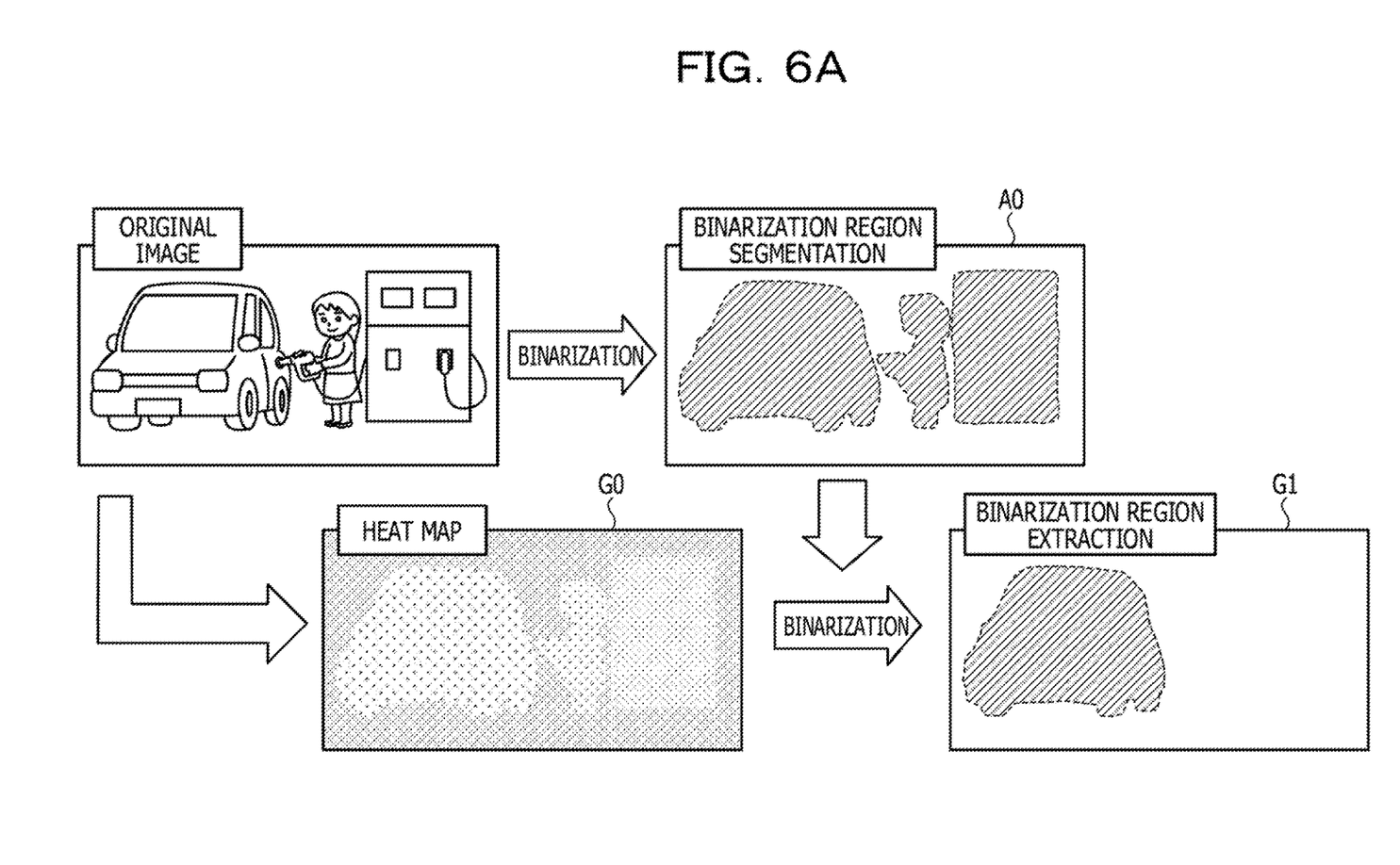
FIG. 6A is a diagram (1) illustrating another example of estimation processing according to the embodiment.
Figure 6B:
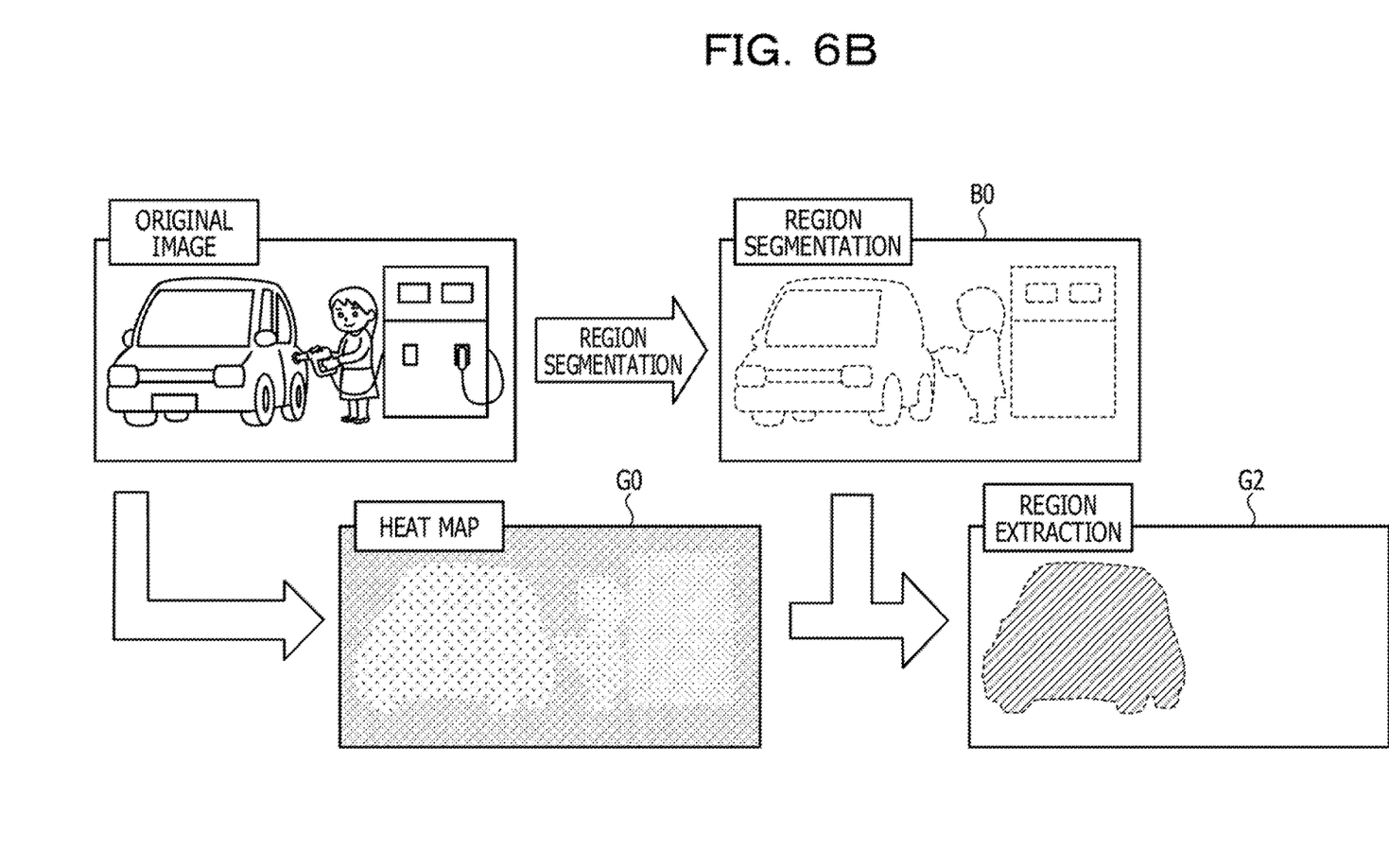
FIG. 6B is a diagram (2) illustrating another example of estimation processing according to the embodiment.

The estimating unit 13 may further carry out conversion from the auxiliary image to a mask image by the following methods. FIG. 6A and FIG. 6B are diagrams illustrating other examples of the estimation processing according to the embodiment. Here, as with FIG. 3, FIG. 4A, and FIG. 4B, the specific task will be described as a task of "discriminating the manufacturer of a car from an image obtained by photographing the car." Furthermore, as the index that represents the degree of compression, the index calculated based on the expression (1) is employed.

As illustrated in FIG. 6A, regarding the original image, the estimating unit 13 arranges the indexes that represent the degree of compression of each element and generates the heat map G0 as an auxiliary image. Here, the heat map G0 is generated in such a manner that the element is highlighted to a larger extent when the degree of compression is higher (index that represents the degree of compression is smaller). The estimating unit 13 applies an unsupervised binarization technique to the same original image and carries out region segmentation by binarization. Then, the estimating unit 13 converts the element about which each index value in the heat map G0 is smaller than a threshold set in advance to a region based on the binarization by using the heat map G0 and the region segmentation by the binarization. This allows the estimating unit 13 to divide the region that represents the common elements from the original image by the method that does not directly depend on the pixel value of the original image. For example, the estimating unit 13 may estimate desired information corresponding to the specific task with high accuracy.

As illustrated in FIG. 6B, regarding the original image, the estimating unit 13 arranges the indexes that represent the degree of compression of each element and generates the heat map G0 as an auxiliary image. Here, the heat map G0 is generated in such a manner that the element is highlighted to a larger extent when the degree of compression is higher (index that represents the degree of compression is smaller). The estimating unit 13 applies an unsupervised region segmentation method to the same original image and carries out detailed region segmentation. The estimating unit 13 calculates an average of the index value represented on the heat map G0 regarding each region obtained by the region segmentation. The estimating unit 13 carries out coupling of the regions about which the average of each region is smaller than a threshold set in advance. This allows the estimating unit 13 to divide the region that represents the common elements from the original image even when accuracy of the restored elements and so forth is insufficient with only the heat map. For example, the estimating unit 13 may estimate desired information corresponding to the specific task with high accuracy.

Flowchart of AE Learning Processing

Figure 7:
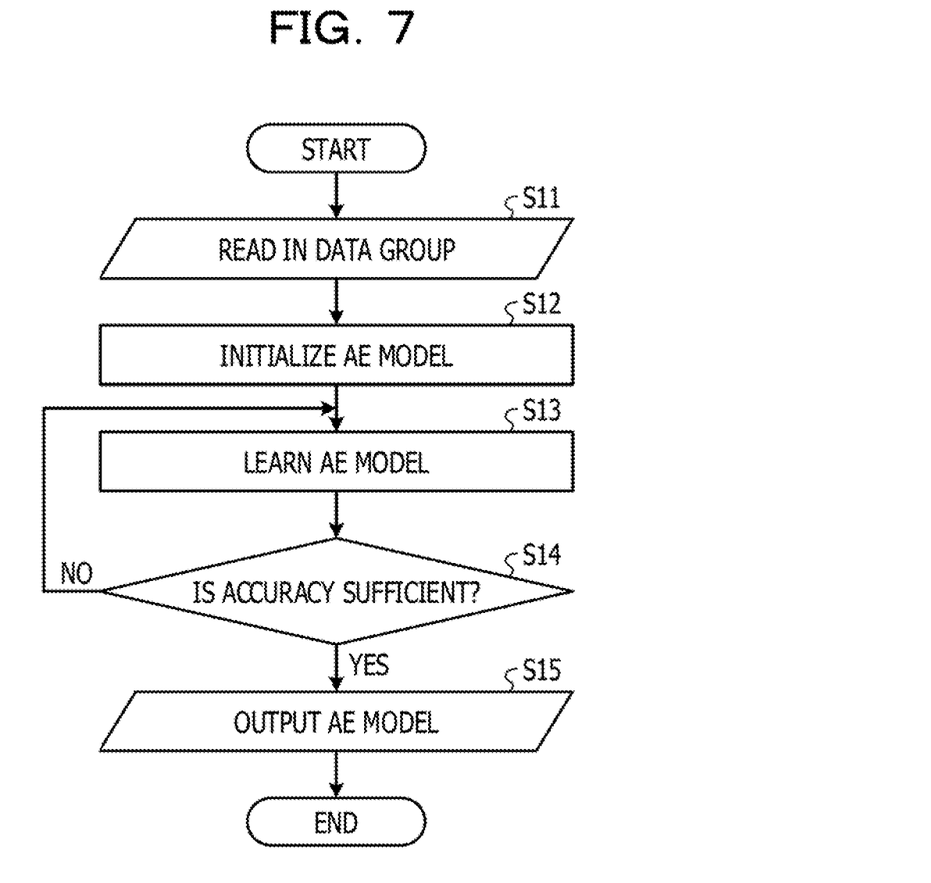
FIG. 7 illustrates one example of a flowchart of AE learning processing according to the embodiment.

FIG. 7 is a diagram illustrating one example of, a flowchart of AE learning processing according to the embodiment. As illustrated in FIG. 7, the AE learning unit 11 reads in the data group 21 corresponding to the specific task (step S11). The AE learning unit 11 initializes, an AE model (step S12).

The AE learning unit 11 learns the AE model (step S13). For example, the AE learning unit 11 learns parameters of the AE in such a manner that the error between the input and output of the AE becomes small by using the data group 21.

The AE learning unit 11 determines whether or not accuracy of the AE model is sufficient (step S14). When determining that the accuracy of the AE model is not sufficient (step S14; No), the AE learning unit 11 makes a transition to the step S13 to further learn the AE model.

Conversely, when determining that the accuracy of the AE model is sufficient (step S14; Yes), the AE learning unit 11 outputs the AE model (step S15). Then, the process of the AE learning processing ends.

Flowchart of Compression Degree Calculation Processing

Figure 8:
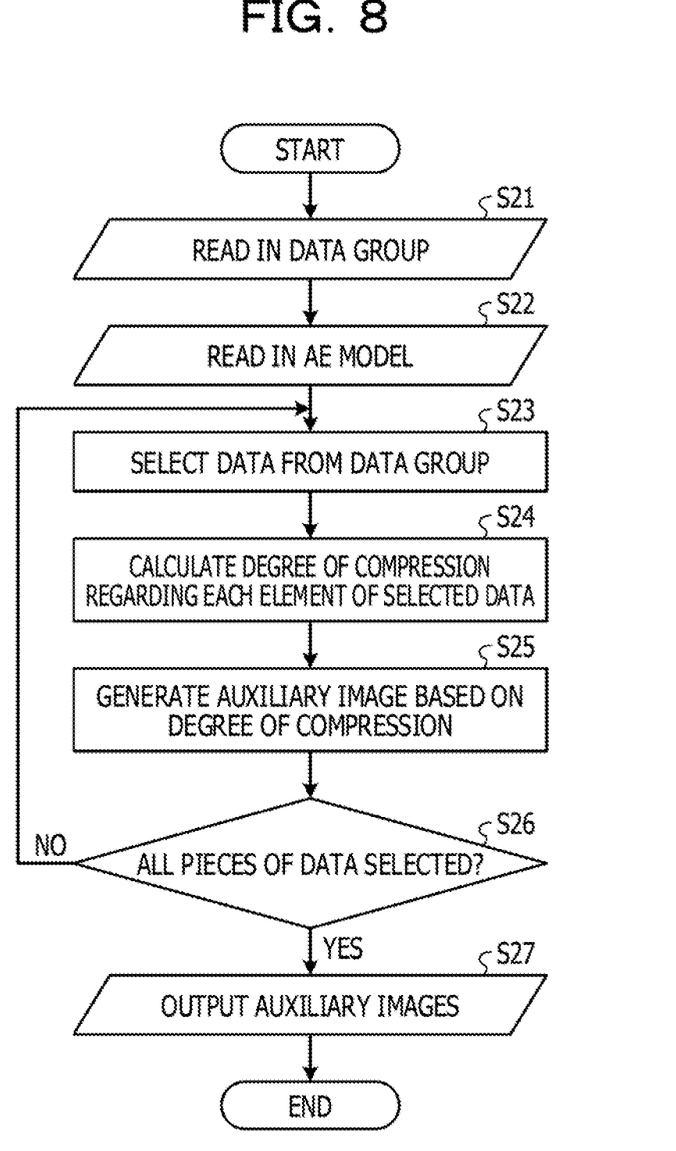
FIG. 8 illustrates one example of a flowchart of compression degree calculation processing according to the embodiment.

FIG. 8 is a diagram illustrating one example of a flowchart of compression degree calculation processing according to the embodiment. As illustrated in FIG. 8, the compression degree calculating unit 12 reads in the data group 21 (step S21). The compression degree calculating unit 12 reads in the AE model that has been learned (step S22).

The compression degree calculating unit 12 selects data from the data group 21 (step S23). The compression degree calculating unit 12 calculates the degree of compression regarding each element of the selected data (step S24). For example, the compression degree calculating unit 12 generates the first compressed data (vector) z 32 obtained by inputting the selected data and causing the selected data to be learned by using the AE model. The compression degree calculating unit 12 generates the second compressed data (vector) z 32 obtained by inputting data resulting from changing an element of the data and causing the data to be learned. Then, the compression degree calculating unit 12 calculates the degree of compression of each element of the selected data by using the first compressed data (vector) z 32 and the second compressed data (vector) z 32. As one example, the compression degree calculating unit 12 calculates a degree about to what extent the corresponding compressed data (vector) (intermediate feature) z changes when the element of the selected data is changed by a minute amount, based on the index that represents the degree of compression.

Then, regarding the selected data, the estimating unit 13 generates an auxiliary image based on the degree of compression of each element (step S25). For example, the estimating unit 13 arranges the indexes that represent the degree of compression of the respective elements to generate a heat map as the auxiliary image.

Then, the compression degree calculating unit 12 determines whether or not all pieces of data have been selected from the data group 21 (step S26). When determining that all pieces of data have not been selected (step S26; No), the compression degree calculating unit 12 makes a transition to the step S23 to select the next data.

Conversely, when determining that all pieces of data have been selected (step S26; Yes), the estimating unit 13 outputs the respective auxiliary images of the data group 21 (step S27). Then, the process of the compression degree calculation processing ends.

According to the above description, regarding each piece of data of the data group 21, the estimating unit 13 estimates highlighted elements as common elements and estimates elements without the highlighting as non-common elements by using the auxiliary image such as a heat map generated based on the degree of compression of each element. Thereafter, the estimation apparatus 1 may use the estimated common elements and the estimated non-common elements for learning of a task and so forth.

For example, the estimation apparatus 1 may generate data obtained by deleting (masking) the non-common elements as unnecessary elements regarding each piece of data of the data group 21 and cause each generated piece of data to be used for learning of the specific task. As a result, the estimation apparatus 1 may improve the accuracy of machine learning of the specific task by causing the specific task to be learned by using a data group 21 resulting from deleting (masking) the unnecessary elements. As the unnecessary elements, for example, in the case of a task of discriminating the manufacturer of a car, there is information on the background of the car, a license plate, a pedestrian, and so forth. Furthermore, as the unnecessary elements, for example, in the case of the task of discriminating the manufacturer of a car, there is information desired to be kept from being used ethically, such as the race, sex, and so forth of the passengers. Moreover, as the unnecessary elements, for example, in the case of the task of discriminating the manufacturer of a car, there is information desired to be kept from being used for privacy protection such as pedestrian part and individual information part on the background of the car.

The compression degree calculating unit 12 calculates the degree of compression of each element of each piece of data of the data group 21 by using the compressed data (vector) (intermediate feature) of the AE. The dimension of the term "intermediate feature" of the AE is desired to be smaller than each piece of data of the data group 21. The ideal dimension is a dimension with which the degree of compression is higher at the common part of the data group 21 than at the non-common part and complete restoration as the AE is enabled. However, the dimension of the intermediate feature of the AE may be smaller than the ideal dimension. This is because, even when the dimension of the intermediate feature of the AE is smaller than the ideal dimension, the magnitude relationship of the degree of compression among elements does not change although restoration of the AE becomes incomplete and the value of the degree itself of compression of each element changes according to the dimension. For example, this is because it suffices that the order relationship of the degree of compression of each element of the data be held.

Effects of Embodiment

According to the above-described embodiment, the estimation apparatus 1 learns an autoencoder with the data group 21 corresponding to a specific task. The estimation apparatus 1 calculates the degree of compression of each part regarding data included in the data group 21 by using the trained autoencoder. The estimation apparatus 1 estimates a common part with another piece of data included in the data group 21 regarding the data corresponding to the specific task based on the calculated degree of compression of each part. According to this configuration, the estimation apparatus 1 may automatically estimate information desired for the specific task without troublesome labor. For example, the estimation apparatus 1 may estimate information unnecessary for the specific task.

Furthermore, according to the above-described embodiment, the estimation apparatus 1 learns the autoencoder in such a manner that the input and output of the autoencoder correspond with, each other by using the data group 21 which corresponds to the specific task and is unsupervised. The estimation apparatus 1 generates a first intermediate feature obtained by inputting data included in the data group 21 and causing the data to be learned by using the autoencoder. The estimation apparatus 1 generates a second intermediate feature obtained by inputting data resulting from processing a part of the data and causing the data to be learned. The estimation apparatus 1 calculates the degree of compression of each part of the data by using the first intermediate feature and the second intermediate feature. According to this configuration, the estimation apparatus 1 may estimate common information corresponding to the specific task because a part with a high compression rate is a part that is common in the data group 21 corresponding to the specific task.

Moreover, according to the above-described embodiment, the estimation apparatus 1 estimates a common part by generating an auxiliary image in which a part with a higher compression rate is highlighted to a larger extent by using the degree of compression of each part. According to this configuration, the estimation apparatus 1 may surely estimate the information desired for the specific task and the unnecessary information by visually displaying the generated auxiliary image.

Furthermore, according to the above-described embodiment, the estimation apparatus 1 further divides target data into regions by a given method and estimates a region about which the compression rate is higher than a given value as the common part from the auxiliary image by using the divided regions. According to this configuration, the estimation apparatus 1 may estimate the desired information corresponding to the specific task with high accuracy by using the regions obtained by dividing the target data.

Moreover, according to the above-described embodiment, the estimation apparatus 1 further divides target data into regions by a given method and calculates the average of the degree of compression obtained from the auxiliary image regarding each divided region. The estimation apparatus 1 couples the divided regions based on the average of each divided region and estimates the coupled regions as the common part. According to this configuration, the estimation apparatus 1 may estimate the desired information corresponding to the specific task with high accuracy by using the regions obtained by dividing the target data.

Others

The case is described in which the estimation apparatus employs a collection of image data as the data group 21 and estimates common elements of the data group 21. However, the estimation apparatus 1 is not limited to this and may employ a collection of audio data as the data group 21 and estimate common audio elements of the data group 21. Furthermore, the estimation apparatus 1 may employ a collection of character string data as the data group 21 and estimate common character string elements of the data group 21.

Furthermore, in the above-described embodiment, the estimation apparatus 1 may be implemented by equipping an information processing apparatus such as a known personal computer or workstation with the respective functions of the above-described control unit 10 and storing unit 20 and so forth.

Moreover, the respective constituent elements of the estimation apparatus 1 diagrammatically represented do not necessarily have to be configured as diagrammatically represented physically. For example, specific forms of distribution and integration of the estimation apparatus 1 are not limited to the diagrammatically-represented forms and all or part of the estimation apparatus 1 may be configured to be distributed or integrated functionally or physically in an arbitrary unit according to various loads, the status of use, and so forth. For example, the compression degree calculating unit 12 and the estimating unit 13 may be integrated as one unit. Furthermore, the estimating unit 13 may be separated into a generating unit that generates a heat map based on the degree of compression of each element and an estimating unit that estimates common elements from the heat map. Moreover, the storing unit 20 may be coupled via a network as an external apparatus of the estimation apparatus 1.

Figure 9:
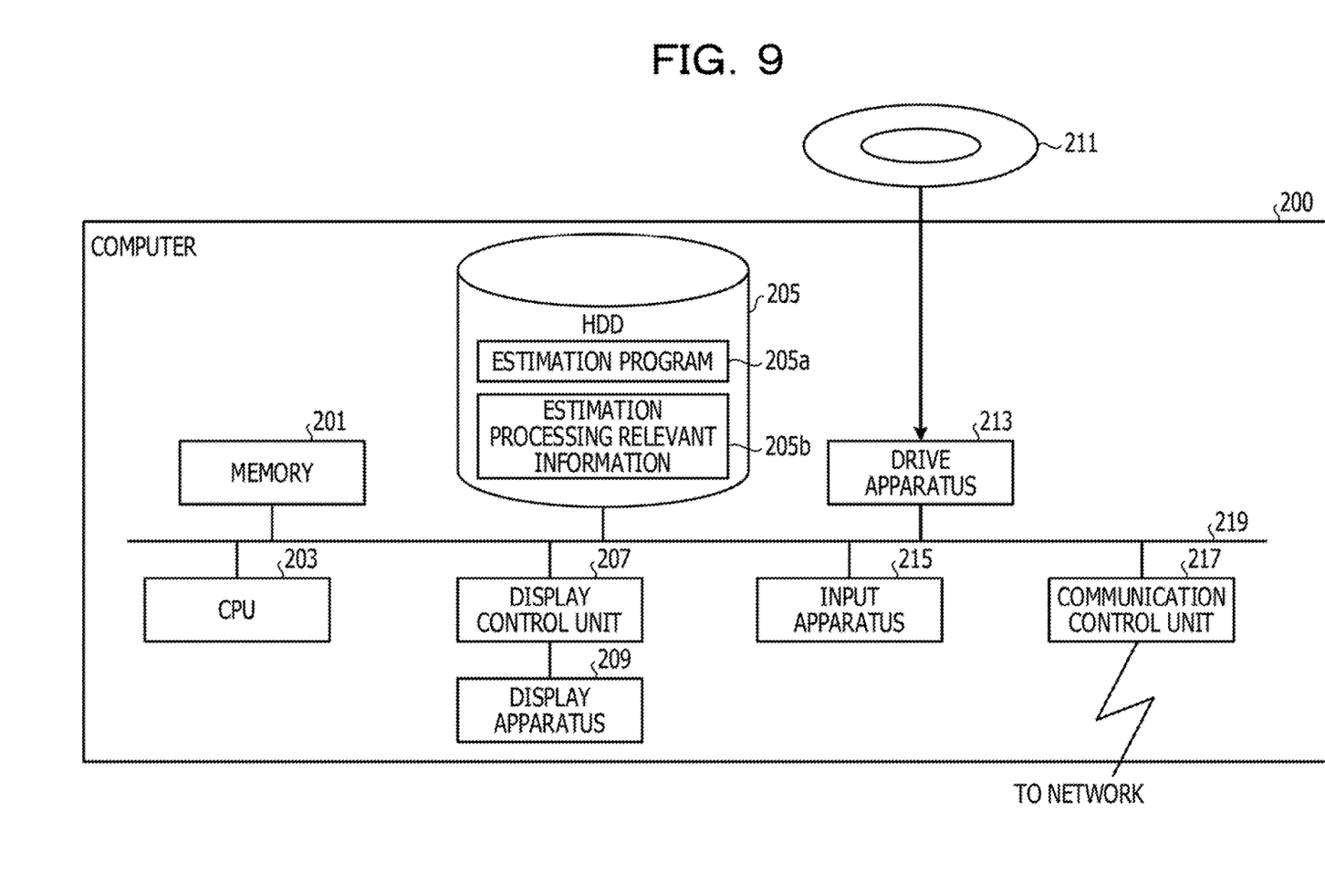
FIG. 9 illustrates one example of a computer that executes an estimation program.

Various kinds of processing explained in the above-described embodiment may be implemented by executing a program prepared in advance by a computer such as a personal computer or work station. In the following, one example of a computer that executes an estimation program that implements the same functions as the estimation apparatus 1 illustrated in FIG. 1 will be described. FIG. 9 is a diagram illustrating one example of the computer that executes the estimation program.

As illustrated in FIG. 9, a computer 200 includes a CPU 203 that executes various kinds of arithmetic processing, an input apparatus 215 that accepts input of data from a user, and a display control unit 207 that controls, a display apparatus 209. Furthermore, the computer 200 includes a drive apparatus 213 that reads a program and so forth from a storage medium and a communication control unit 217 that carries out transfer of data with another computer through a network. Moreover, the computer 200 includes a memory 201 that temporarily stores various, kinds of information and a hard disk drive (HDD) 205. The memory 201, the CPU 203, the HDD 205, the display control unit 207, the drive apparatus 213, the input apparatus 215, and the communication control unit 217 are coupled by a bus 219.

The drive apparatus 213 is an apparatus for a removable disc 211, for example. The HDD 205 stores an estimation program 205a and estimation processing relevant information 205b.

The CPU 203 reads out the estimation program 205a and loads it in the memory 201 to execute it as a process. This process corresponds to the respective functional units of the estimation apparatus 1. The estimation processing relevant information 205b corresponds to the data group 21 the AE model parameters 22, and the estimation result 23. The removable disc 211 stores various pieces of information such as the estimation program 205a, for example.

The estimation program 205a does not necessarily have to be stored in the HDD 205 from the beginning. For example, the estimation program 205a is stored in "portable physical media" such as a flexible disk (FD), a compact disc read only memory (CD-ROM), a digital versatile disc (DVD), a magneto-optical disc, and an integrated circuit (IC) card inserted in the computer 200. Then, the computer 200 may read out the estimation program 205a from the portable physical media described above and execute the estimation program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing an estimation program which causes a processor to perform processing for object recognition, the processing comprising:
    executing learning processing by training an autoencoder with a data group corresponding to a specific task;
    calculating a degree of compression of each part regarding data included in the data group by using the trained autoencoder; and
    estimating a common part with another piece of data included in the data group regarding the data corresponding to the specific task based on the calculated degree of compression of each part.

2. The non-transitory computer-readable storage medium according to claim 1, wherein
    the learning learns the autoencoder in such a manner that an input and an output of the autoencoder correspond with each other by using the data group which corresponds to the specific task and is unsupervised, and
    the calculating generates a first intermediate feature obtained by inputting data included in the data group and causing the data to be learned by using the autoencoder, and generates a second intermediate feature obtained by inputting data resulting from processing a part of the data and causing the data to be learned, and calculates a degree of compression of each part of the data by using the first intermediate feature and the second intermediate feature.

3. The non-transitory computer-readable storage medium according to claim 1, wherein
    the estimating generates an auxiliary image in which a part with a higher compression rate is highlighted to a larger extent regarding the data group by using the degree of compression of each part and estimates the common part based on the auxiliary image generated.

4. The non-transitory computer-readable storage medium according to claim 3, wherein
the estimating further divides target data into regions by a given method and estimates a region about which a compression rate is higher than a given value as the common part from the auxiliary image by using the divided regions.

5. The non-transitory computer-readable storage medium according to claim 3, wherein
the estimating further divides target data into regions by a given method, and calculates an average of the degree of compression obtained from the auxiliary image regarding each divided region, and couples divided regions based on the average of each divided region, and estimates the coupled regions as the common part.

6. The non-transitory computer-readable storage medium according to claim 1, wherein
the data group is a data group of image data, a data group of audio data, or a data group of text data.

7. An estimation apparatus comprising:
a memory; and
a processor coupled to the memory, the processor being configured to
execute a learning processing that includes training an autoencoder with a data group corresponding to a specific task;
execute a calculating processing that includes calculating a degree of compression of each part regarding data included in the data group by using the autoencoder learned by the learning processing; and
execute an estimating processing that includes estimating a common part with another piece of data included in the data group regarding the data corresponding to the specific task based on the degree of compression of each part calculated by the calculating processing.

8. An estimation method implemented by a computer, the estimation method comprising:
executing learning processing by training an autoencoder with a data group corresponding to a specific task;
calculating a degree of compression of each part regarding data included in the data group by using the trained autoencoder; and
estimating a common part with another piece of data included in the data group regarding the data corresponding to the specific task based on the calculated degree of compression of each part.

* * * * *